United States Patent

Wang

[15] 3,661,677
[45] May 9, 1972

[54] POST-HEAT TREATMENT FOR POLYVINYLIDENE CHLORIDE-COATED FILM

[72] Inventor: James C. Wang, Kendall Park, N.J.
[73] Assignee: Allied Chemical Corporation, New York, N.Y.
[22] Filed: Oct. 10, 1969
[21] Appl. No.: 865,335

[52] U.S. Cl. ..............................156/315, 117/62, 156/322, 161/227, 161/247, 161/256
[51] Int. Cl. ..........................................C09j 5/00
[58] Field of Search ..............156/322, 315; 117/62; 161/190, 161/227, 247, 256

[56] References Cited

UNITED STATES PATENTS

| 3,514,367 | 5/1970 | James | 161/256 X |
|---|---|---|---|
| 2,768,905 | 10/1956 | Massey | 156/322 X |
| 3,370,972 | 2/1968 | Nagel et al. | 117/7 |
| 3,420,679 | 1/1969 | Gifford et al. | 99/171 |
| 3,518,103 | 6/1970 | Visnovsky | 161/190 X |

Primary Examiner—Carl D. Quarforth
Assistant Examiner—R. L. Tate
Attorney—Jonathan Plaut

[57] ABSTRACT

In the preparation of a laminate of polyvinylidene chloride-coated nylon film with polyethylene film, the polyvinylidene chloride-coated nylon film is heated to at least about 110° F. for a period of time prior to applying adhesive for the lamination. This post-heat treatment of the coated nylon affords a laminate with very low retained solvent level without the need for lengthy storage. The product is suitable for packaging food products.

2 Claims, 1 Drawing Figure

Patented May 9, 1972
3,661,677
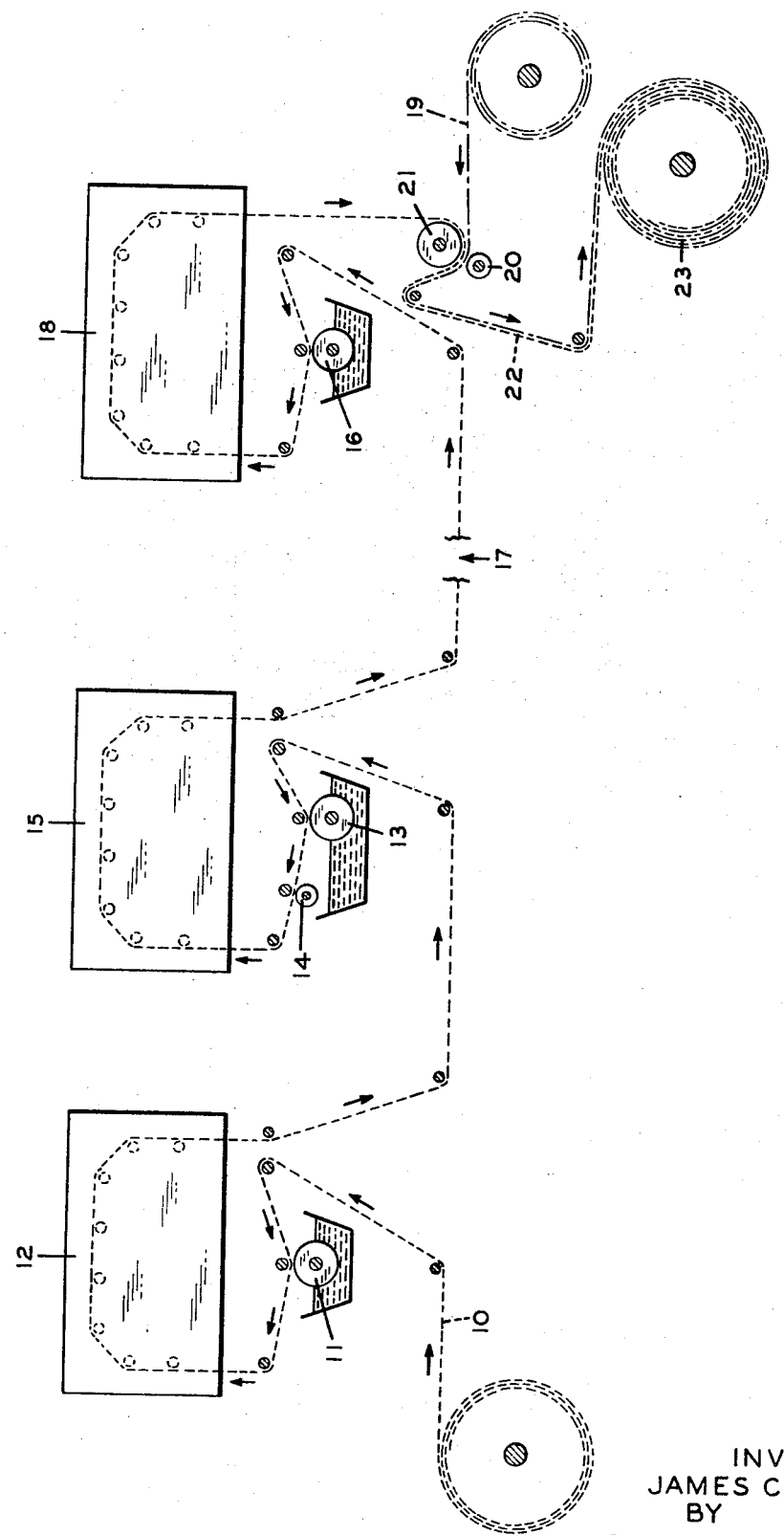
INVENTOR
JAMES C. WANG
BY
David J. Brody
AGENT

POST-HEAT TREATMENT FOR POLYVINYLIDENE CHLORIDE-COATED FILM

BACKGROUND OF THE INVENTION

This invention relates to a process for the production of nylon-polyethylene film laminates, and in particular to the production of polyvinylidene chloride-coated nylon-polyethylene film laminates having a low level of retained solvent.

A general practice has developed in the packaging industry of utilizing film laminates where a single film would not provide all characteristics needed in a particular packaging application. For instance nylon-polyethylene film laminates are often used wherein the nylon film affords a laminate which is readily thermoformable, ductile and strong, and the polyethylene film gives the laminate capacity for rapid heat sealing. These laminates have been modified in certain instances where a low permeability to oxygen was required, such as in packaging of luncheon meats, cheeses, etc. For this purpose, a coating of polyvinylidene chloride has been applied to the nylon film prior to lamination, which coating served as an effective oxygen barrier. Typically, these laminates are produced by coating the nylon with polyvinylidene chloride, then applying a solution of adhesive to the polyvinylidene chloride surface, evaporating the solvent from the applied adhesive, and laminating the coated nylon with the polyethylene film by passing the two through nip rolls. The various techniques which are commonly utilized in applying the coatings to the film and in laminating the films are disclosed in detail in "Fundamentals to Consider in Selecting Coating Methods" *Paper, Film and Foil Converter*, February through July, 1963.

When the laminate is to be used in food packaging and other applications in which retained solvent might be harmful, it is necessary to reduce the level of solvent retained from application of the adhesive solution to a low level, for example, to less than about 100 parts per million (p.p.m.). For this purpose, after application of the adhesive, the polyvinylidene chloride-coated film is passed through a drying oven, or subjected to some other drying means. It has been found, however, that unreasonably long residence times are required to reduce the solvent content to an acceptable level, in contrast to short times required when the polyvinylidene coating is not present. In fact, it is often necessary to store the coated nylon for a substantial length of time in order to reduce the solvent level to less than 100 p.p.m.

SUMMARY OF THE INVENTION

It has now been found that retained solvent levels of less than 100 p.p.m. can be readily attained in nylon-polyethylene film laminates having an intermediate layer of polyvinylidene chloride by post-heat treatment of the polyvinylidene chloride-coated nylon film prior to applying adhesive thereto. According to the instant invention, laminates with low retained solvent levels are produced by applying a polyvinylidene chloride coating to the surface of nylon film and heating the coated nylon film at a temperature of at least about 110° F. for a time up to about 6 hours, which heating is sufficient to render the polyvinylidene chloride coating substantially fully crystalline. A solvent-based adhesive is then applied to the crystalline polyvinylidene chloride coating which is then dried to remove solvent therefrom and provide a retained solvent level less than about 100 p.p.m. in the laminate product. Polyethylene film is then laminated to the polyvinylidene chloride coating of the nylon film to afford the finished product.

BRIEF DESCRIPTION OF DRAWING

For a better understanding of the instant invention, reference is made to the accompanying drawing wherein is provided a schematic diagram of the instant process.

DETAILED DESCRIPTION OF THE INVENTION

The process of the instant invention for the production of polyvinylidene chloride-coated nylon polyethylene film laminates involves the addition of a post-heat treatment step to the lamination process as conducted heretofore. With reference to the accompanying drawing, primer is applied to the surface of advancing nylon film 10 by means of gravure roll 11 and coated film 10 is passed through drying oven 12, following which a coating of polyvinylidene chloride is applied over the primer by means of pick-up roll 13 and metering rod 14. The resulting coated nylon film is then subjected to the novel post-heat treatment step by passing the film through drying oven 15, after which treatment solvent-based adhesive is applied to the polyvinylidene chloride coating by means of gravure roll 16. Depending upon the temperature and residence time in drying oven 15, it may be desirable to interrupt the process, as indicated at 17, and store coated film 10 for a short time at elevated temperature prior to applying the adhesive. This optional storage at elevated temperature constitutes a continuation of the post-heat treatment step initiated in drying oven 15. After applying the adhesive, the solvent is then removed by passing the film through drying oven 18. As coated nylon film 10 exits oven 18 it is laminated to polyethylene film 19 by passing the two films between nip roll 20 and binding roll 21. The resulting film laminate 22 is collected on wind-up roll 23.

The amount of polyvinylidene chloride applied to the nylon film is determined by the effectiveness of the oxygen barrier desired. Typically, a permeability to oxygen in the range of less than about 0.5 cc./atm./24 hours/100 in$^2$ is desired, for which purpose between about 3.5 and 4.5 pounds of polyvinylidene chloride will be applied per ream of nylon film (3,000 ft.$^2$). Of course, greater or lesser amounts may be applied consistently with the instant invention, depending upon the desired specifications of the finished laminate product. The coating can be applied by any of the methods generally familiar to those skilled in the art, including those methods outlined in the references cited hereinbefore. Primer coat may be applied to the film prior to the polyvinylidene chloride coat; this feature is not essential for successful production of laminates but has often been utilized heretofore to obtain better adhesion between the nylon film and polyvinylidene chloride.

After application of the polyvinylidene chloride coat to the nylon film, the coated film is subjected to a novel heat treatment step, rather than to direct application of adhesive as has been the practice heretofore. It has been found that laminates prepared according to the instant improved process have retained solvent levels as low as 1 percent of the levels obtained when the heat treatment step is not employed. A minimum temperature of 110° F. is preferred for this heat treatment step. Inasmuch as this treatment must be sufficient to render the polyvinylidene chloride substantially fully crystalline, the time of heating will vary with the temperature employed. When the film is heated at 110° F., it has been found that 6 hours of heating are sufficient to afford the desired crystallinity, and as higher temperatures are employed, the required time will correspondingly diminish. It is preferred to heat the film at a temperature within the range of about 110° F.–220° F., more preferably within the range of about 110° F.–140° F., with the heating time ranging up to about 6 hours and being sufficient to render the polyvinylidene chloride film substantially fully crystalline at the particular temperature employed. Whether any specific set of time and temperature conditions are sufficient for this purpose can be readily determined beforehand by subjecting the coated nylon to such conditions and then determining the degree of crystallinity, for example, by means of such standard techniques as attenuated total reflectance. Inasmuch as the required conditions in the heat treatment will vary with the thickness of the polyvinylidene chloride coating on the nylon film, it is desirable to re-evaluate the adequacy of the heat treatment when the thickness of the coating is varied.

The heat treatment can be accomplished by any of a variety of standard methods familiar to those with skill in the art, for example, by means of hot air, radiant sources, heated rolls, etc. Depending upon the required residence time in the heat treatment, it may be advantageous to subject the film to it while it is advancing to adhesive-application stage, or it may be advantageous to collect the film temporarily for this purpose.

After the heat treatment, solvent-based adhesive is applied to the polyvinylidene chloride coating of the film. Any of the standard adhesive compositions can be utilized for this purpose, typically, for example, a polyurethane composition containing 10–20 percent solids in common solvents such as ethyl acetate, methyl ethyl ketone, toluene and mixtures thereof. These solvent-based adhesives are commercially available materials. They are applied to the advancing film by gravure roll, metering rod, or other coating techniques commonly employed, after which application the solvent is removed by evaporation. Heretofore, without the heat treatment step of the instant invention, great effort has been required to remove substantially all the solvent so that the finished laminates could be used in conjunction with foods and other solvent-sensitive materials. However, with the instant invention, retained solvent levels lower than 100 ppm, and often less than 10 ppm, are readily obtained by passing the film through a drying oven.

The following example is provided to illustrate the instant invention more fully. It is provided for illustrative purposes only and should not be construed as limiting the invention, which is defined in the appended claims. It will be clear that various modifications and variations can be made from the procedure of the example without departing from the scope of the invention. In the example, all temperatures are expressed in Fahrenheit degrees.

EXAMPLE

To an advancing sheet of 0.9 mil nylon 6 film is applied by means of a gravure roll a polyurethane primer coat at the rate of 0.2 pounds of primer per ream (3,000 ft$^2$). After the coated film is dried, polyvinylidene chloride is then applied over the primer coat by means of a metering rod, at the rate of 4 pounds per ream, which is sufficient to provide the finished laminate with an oxygen permeability less than 0.5 cc./atm./24 hours/100 in$^2$. Following application of the polyvinylidene chloride, the nylon film is heat treated by maintaining it in a 110° F. oven for 6 hours, thereby rendering the polyvinylidene chloride coating substantially fully crystalline. Polyurethane adhesive (20 percent solids in ethyl acetate) is applied over the polyvinylidene chloride coating via gravure roll at the rate of 1.2 pounds per ream, following which application the film is passed into a drying oven wherein a carrier belt carries the adhesive bearing surface of the film beneath a series of hot (greater than 200° F.) air nozzles to evaporate the solvent. The nylon film is then laminated to a 1.5 mil polyethylene film by passing the two between a nip roll and a heated binding roll to afford the finished material which is collected on a windup roll.

This procedure is repeated with additional samples of film, wherein the conditions of the heat treatment are varied. Approximate retained solvent levels for each set of conditions are set forth below.

| Run No. | Heat Treatment Temp.(°F.) | Time(Hrs.) | Approximate Retained Solvent Level |
|---|---|---|---|
| 1 | 100 | 3.5 | 350–400 ppm |
| 2 | 110 | 3.5 | 250–300 ppm |
| 3 | 110 | 6.0 | 3 ppm |
| 4 | 140 | 3.5 | 3 ppm |
| 5 | 140 | 6.0 | 3 ppm |

What is claimed is:

1. In the process for production of nylon-polyethylene film laminate having an intermediate layer of polyvinylidene chloride, which process includes the steps of applying a polyvinylidene chloride coating to nylon film, applying a solvent-based adhesive to the surface of said polyvinylidene chloride coating, drying said coated nylon film to substantially remove said solvent therefrom, and laminating polyethylene film to the polyvinylidene chloride coating of said nylon film, the improvement which comprises:

heating said coated nylon film, prior to applying said solvent-based adhesive thereto, at a temperature between about 110° F. and 140° F. for a time up to about 6 hours, said heating being sufficient to render said polyvinylidene chloride coating substantially fully crystalline; and drying solvent from said coated nylon film after applying thereto said solvent-based adhesive to provide a retained solvent level less than about 100 p.p.m. in the laminate product.

2. The improved process of claim 1 wherein the retained solvent level in said laminate is less than about 50 p.p.m.

* * * * *